United States Patent
Sculthorpe et al.

(10) Patent No.: US 11,084,763 B2
(45) Date of Patent: Aug. 10, 2021

(54) COMPOSITIONS SUITABLE FOR USE IN MAKING FERTILIZERS, METHODS FOR MAKING SUCH COMPOSITIONS, AND METHOD FOR MAKING FERTILIZERS USING THE SAME

(71) Applicant: Milliken & Company, Spartanburg, SC (US)

(72) Inventors: Christopher M. Sculthorpe, Lyman, SC (US); Adam J. Newberry, Greer, SC (US); Kellie P. Skinner, Inman, SC (US)

(73) Assignee: Milliken & Company, Spartanburg, SC (US)

( * ) Notice: Subject to any disclaimer, the term of this patent is extended or adjusted under 35 U.S.C. 154(b) by 361 days.

(21) Appl. No.: 15/622,207

(22) Filed: Jun. 14, 2017

(65) Prior Publication Data

US 2017/0362140 A1    Dec. 21, 2017

Related U.S. Application Data

(60) Provisional application No. 62/351,958, filed on Jun. 18, 2016.

(51) Int. Cl.
| | |
|---|---|
| *C05G 3/90* | (2020.01) |
| *C05G 5/30* | (2020.01) |
| *C05C 3/00* | (2006.01) |
| *C05C 11/00* | (2006.01) |
| *C09K 15/26* | (2006.01) |
| *C09K 15/04* | (2006.01) |
| *C05C 9/00* | (2006.01) |

(52) U.S. Cl.
CPC ............... *C05G 3/90* (2020.02); *C05C 3/005* (2013.01); *C05C 9/005* (2013.01); *C05C 11/00* (2013.01); *C05G 5/30* (2020.02); *C09K 15/04* (2013.01); *C09K 15/26* (2013.01); *Y02P 60/21* (2015.11)

(58) Field of Classification Search
None
See application file for complete search history.

(56) References Cited

U.S. PATENT DOCUMENTS

| | | | |
|---|---|---|---|
| 5,698,003 A | 12/1997 | Omilinsky et al. | |
| 8,888,886 B1* | 11/2014 | Whitehurst | C05G 3/08 71/28 |
| 2003/0228981 A1* | 12/2003 | Wertz | A01C 1/06 504/100 |
| 2007/0157689 A1 | 7/2007 | Sutton et al. | |
| 2007/0261596 A1 | 11/2007 | Fechner et al. | |
| 2010/0206031 A1* | 8/2010 | Whitehurst | C05C 9/00 71/30 |
| 2014/0037570 A1* | 2/2014 | Whitehurst | C05G 3/08 424/76.6 |
| 2014/0047882 A1 | 2/2014 | Gabrielson et al. | |
| 2014/0090432 A1* | 4/2014 | McKnight | C05G 3/0041 71/28 |
| 2015/0143860 A1 | 5/2015 | McKnight et al. | |
| 2016/0075613 A1 | 3/2016 | Gabrielson et al. | |
| 2017/0240483 A1* | 8/2017 | McKnight | C09K 15/28 |
| 2017/0283334 A1* | 10/2017 | Rohrer | C05D 9/02 |
| 2018/0170818 A1* | 6/2018 | McKnight | C05C 11/00 |

FOREIGN PATENT DOCUMENTS

| | | |
|---|---|---|
| EP | 1 160 292 A2 | 12/2001 |
| WO | WO 2015/001457 A2 | 1/2015 |

OTHER PUBLICATIONS

PCT/US2017/037371 International Search Report, filed Jun. 14, 2017, 6 pages.
PCT/US2017/037371 Written Opinion of the International Searching Authority, filed Jun. 14, 2017, 9 pages.

* cited by examiner

*Primary Examiner* — Wayne A Langel
(74) *Attorney, Agent, or Firm* — Robert M. Lanning

(57) ABSTRACT

A composition comprises a nonaqueous, liquid carrier, an inhibitor compound, and a colorant composition comprising an azo colorant. A method for making the composition is also provided. A method for making a fertilizer composition using the disclosed composition is also provided.

18 Claims, No Drawings ated to the fertilizer. Different colors are used to distinguish different types of fertilizer, thereby serving as a visual indicator that a certain fertilizer has been applied to the target crops. Further, the color in fertilizers provides a visual aid by which one can qualitatively evaluate the rate at which the fertilizer has been applied to the target crops.

However, by a mechanism that is not well understood, certain colorants formulated into fertilizers containing a urease or nitrification inhibitor have been observed to rapidly lose their color upon exposure to light. In particular, fertilizers containing these colorants have been observed to rapidly decolorize or exhibit significant changes in the shade of the color after application to crops/soil. In these situations, the end-user loses the visual cue that enables them to determine which fertilizer(s) have been applied to the crops/soil and to qualitatively assess how much of each fertilizer has been applied.

Thus, a need remains for fertilizers and compositions for making fertilizers that contain one or more colorants and a urease inhibitor or nitrification inhibitor and yet exhibit satisfactory colorfastness when exposed to light. The compositions described herein attempt to provide such fertilizers and compositions for making fertilizers.

COMPOSITIONS SUITABLE FOR USE IN MAKING FERTILIZERS, METHODS FOR MAKING SUCH COMPOSITIONS, AND METHOD FOR MAKING FERTILIZERS USING THE SAME

CROSS-REFERENCE TO RELATED APPLICATIONS

This application claims, pursuant to 35 U.S.C. § 119(e), priority to and the benefit of the filing date of U.S. Patent Application No. 62/351,958 filed on Jun. 18, 2016, which application is hereby incorporated by reference in its entirety.

TECHNICAL FIELD OF THE INVENTION

This application relates to colored fertilizer compositions exhibiting improved color stability and compositions suitable for use in making the same. In specific embodiments, the application relates to compositions comprising one or more urease inhibitors that exhibit improved color stability when applied to a fertilizer.

BACKGROUND

Agriculture currently utilizes fertilizers to deliver the needed nutrients of nitrogen, phosphorus, potassium, sulfur, calcium, and magnesium to plants through the application of fertilizers to the soil. Nitrogen generally is the most yield-limiting and costly nutrient element in crop production. Thus, nitrogen is the primary nutrient in fertilizers, and urea is the primary nitrogen source in fertilizers. In addition to urea, nitrogen can be formulated into a fertilizer using ammonium nitrate, ammonium sulfate, manure, ammonium phosphate, similar compounds, and mixtures thereof.

Generally, fertilizers are applied to the soil as either a liquid or a solid. Maintaining a sufficient level of nitrogen concentration in the soil over time can prove difficult due to several processes that deplete nitrogen and nitrogen-containing compounds. For example, nitrogen and nitrogen-containing compounds (such as urea) exhibit some solubility in water. Thus, when rain or water run-off contacts the soil, the nitrogen or nitrogen containing compounds may be carried with the water to surrounding waterways.

Additionally, nitrogen is lost through the action of enzymes and bacteria present in the soil, such as the urease enzyme. For example, attack by the urease enzyme causes urea to degrade to carbon dioxide and ammonia. Further, ammonium-based nitrogen sources in the fertilizer are oxidized to nitrates by the action of *Nitrosomonas* and *Nitrobacter* bacteria in the soil. While the conversion of urea to ammonia and oxidation of ammonia and ammonium to nitrates within the soil is beneficial to plants, conversions occurring on top of the soil, where fertilizers are applied, result in a loss of nitrogen to the atmosphere due to prolonged wet field conditions or warm temperatures. Thus, to improve the longevity of nitrogen in the soil, fertilizers have been treated with urease inhibitors and nitrification inhibitors. These inhibitors are usually imparted onto the surface of fertilizer granules or added to liquid fertilizers through an aqueous solution.

In addition to nutrients and such inhibitors, fertilizers frequently contain auxiliary ingredients that are intended to facilitate use and application to crops. For example, fertilizers frequently contain colorants (e.g., dyes) in order to impart an aesthetically pleasing or visually distinct color-

BRIEF SUMMARY OF THE INVENTION

In a first embodiment, the invention provides a composition comprising:
(a) a nonaqueous, liquid carrier;
(b) an inhibitor compound selected from the group consisting of urease inhibitors, nitrification inhibitors, and mixtures thereof; and
(c) a colorant composition, the colorant composition comprising:
(i) an azo colorant; and
(ii) about 1 wt. % to about 60 wt. % of water.

In a second embodiment, the invention provides a method for making a composition, the method comprising the steps of:
(a) providing a nonaqueous, liquid carrier;
(b) providing an inhibitor compound selected from the group consisting of urease inhibitors, nitrification inhibitors, and mixtures thereof;
(c) providing a colorant composition, the colorant composition comprising:
(i) an azo colorant; and
(ii) about 1 wt. % to about 60 wt. % of water;
(d) mixing the nonaqueous, liquid carrier, the inhibitor compound, and the colorant composition to produce a composition.

In a third embodiment, the invention provides a method for producing a fertilizer composition, the method comprising the steps of:
(a) providing a granular substrate having a surface, the granular substrate comprising a nitrogen source;
(b) providing a coating composition, the coating composition comprising:
(i) a nonaqueous, liquid carrier;
(ii) an inhibitor compound selected from the group consisting of urease inhibitors, nitrification inhibitors, and mixtures thereof; and
(iii) a colorant composition, the colorant composition comprising:
(1) an azo colorant; and
(2) about 1 wt. % to about 60 wt. % of water; and
(c) applying the coating composition to at least a portion of the surface of the granular substrate; and (d) drying the granular substrate from step (c) to produce a coating on at least a portion of the surface of the granular substrate.

DETAILED DESCRIPTION OF THE INVENTION

In a first embodiment, the invention provides a composition comprising:
(a) a nonaqueous, liquid carrier;
(b) an inhibitor compound selected from the group consisting of urease inhibitors, nitrification inhibitors, and mixtures thereof; and
(c) a colorant composition, the colorant composition comprising:
(i) an azo colorant; and
(ii) about 1 wt. % to about 60 wt. % of water.

The nonaqueous, liquid carrier can be any suitable nonaqeuous liquid. Generally, the nonaqueous, liquid carrier is a substance in which the inhibitor compound(s) are soluble. Suitable nonaqueous, liquid carriers include, but are not limited to, N-methylpyrrolidone, polyvinylpyrrolidone, propylene glycols, ethanolamine, propylene carbonate, alkylglycol ethers, alkyl-arylpolyether alcohols, and mixtures thereof. Suitable nonaqueous, liquid carriers include the solvents disclosed in U.S. Pat. No. 5,698,003, United States Patent Application Publication No. 2014/0047882, United States Patent Application Publication No. 2015/0143860, and United States Patent Application Publication No. 2016/0075613, the disclosures of which are hereby incorporated by reference.

The nonaqeuous, liquid carrier can be present in the composition in any suitable amount. Typically, the nonaqueous, liquid carrier is present in the composition in an amount of about 50 wt. % or more based on the total weight of the composition. Preferably, the nonaqueous, liquid carrier is present in the composition in an amount of about 50 wt. % to about 99 wt. % based on the total weight of the composition.

As utilized herein, the term "urease inhibitor" refers to any substance that inhibits hydrolytic action on urea by a urease enzyme. Suitable urease inhibitors include, but are not limited to, N-(n-butyl)thiophosphoric triamide, N-(n-butyl)phosphoric triamide, N-(2-nitrophenyl)phosphoric triamide, thiophosphoryl triamide, phenyl phosphorodiamidate, cyclohexyl thiophosphoric triamide, cyclohexyl phosphoric triamide, phosphoric triamide, hydroquinone, 1,4-benzoquinone, hexaamidocyclotriphosphazene, thiopyridines, thiopyrimidines, thiopyridine-N-oxides, N,N-dihalo-2-imidazolidinone, N-halo-2-oxazolidinone, and mixtures thereof. In a preferred embodiment, the composition comprises a urease inhibitor, and the urease inhibitor is N-(n-butyl) thiophosphoric triamide.

When present in the composition, the urease inhibitor can be present in any suitable amount. Preferably, the urease inhibitor is present in the composition about 1 wt. % to about 50 wt. % based on the total weight of the composition.

As utilized herein, the term "nitrification inhibitor" refers to any substance that inhibits the biological oxidation of ammoniacal-N to nitrate-N. Nitrification inhibitors generally achieve this inhibition by depressing the activity of *Nitrosomonas* and/or *Nitrobacter* bacteria. Suitable nitrification inhibitors include, but are not limited to, 2-chloro-6-(trichloromethyl)pyridine, 2-amino-4-chloromethylpyrimidine, dicyandiamide, 3,4-dimethylpyrazole phosphate, cyanoguanidine, N-2,5-dichlorophenylsuccinanilic acid, guanyl thiourea, sulfanyl-amidothiazole, 4-amino-1,2,4-triazole, 3-methylpyrazole, 1H-1,2,4-triazole, and mixtures thereof. In a preferred embodiment, the composition comprises a nitrification inhibitor, and the nitrification inhibitor is selected from the group consisting of 2-chloro-6-(trichloromethyl)pyridine, dicyandiamide, 3,4-dimethylpyrazole phosphate, and mixtures thereof. In a particularly preferred embodiment, the nitrification inhibitor is dicyandiamide.

When present in the composition, the nitrification inhibitor can be present in any suitable amount. Preferably, the nitrification inhibitor is present in the composition about 1 wt. % to about 50 wt. % based on the total weight of the composition.

In a preferred embodiment, the composition comprises both a urease inhibitor and a nitrification inhibitor. In such an embodiment, the urease inhibitor and nitrification inhibitor can be any of the compounds disclosed above. In a particularly preferred embodiment, the urease inhibitor is N-(n-butyl) thiophosphoric triamide, and the nitrification inhibitor is selected from the group consisting of 2-chloro-6-(trichloromethyl)pyridine, dicyandiamide, 3,4-dimethylpyrazole phosphate, and mixtures thereof. In such embodiments, the urease inhibitor and the nitrification inhibitor can be present in the composition in a combined amount of about 1 wt. % to about 50 wt. % based on the total weight of the composition. Further, in such embodiments, the urease inhibitor and nitrification inhibitor can be present in any suitable relative amounts. Preferably, the ratio (by weight) of urease inhibitor to nitrification inhibitor present in the composition is about 1:50 to about 10:1.

As noted above, the composition comprises a colorant composition. The purpose of the colorant composition is to impart the desired shade to the composition and, as described below, the fertilizer composition produced using the composition. Preferably, the colorant composition is a liquid at ambient conditions (e.g., at standard ambient temperature and pressure). A colorant composition that is liquid at ambient conditions facilitates handling, storage, transport, and dosing of the appropriate amount of colorant. The colorant composition comprises an azo colorant and water. The colorant preferably does not comprise any nonaqueous carriers or solvents (e.g., organic solvents). The water acts as a carrier, solvent, and/or diluent for the azo colorant. The water can be present in the colorant composition in any suitable amount. Preferably, the water is present in the colorant composition in an amount of about 1 wt. % or more. In another preferred embodiment, the water is present in the colorant composition in an amount of about 60 wt. % or less. Thus, in a preferred embodiment, the water is present in the colorant composition in an amount of about 1 wt. % to about 60 wt. %.

The azo colorant in the colorant composition can be any suitable azo colorant. Preferably, the azo colorant exhibits substantial solubility in water (i.e., sufficient solubility in water to provide a liquid colorant composition at a water content of about 60 wt. % or less). Preferably, the azo colorant is a liquid at ambient conditions (e.g., at standard ambient temperature and pressure). In a preferred embodiment, the azo colorant comprises a polyoxyalkylene polymer chain covalently bound to the azo chromophore. In another preferred embodiment, the azo colorant comprises a quaternary ammonium counterion that comprises at least one polyoxyalkylene polymer chain covalently bound to the ammonium nitrogen. Suitable azo colorants include those azo colorants marketed for agricultural use by Milliken & Company under the Liquitint® name.

The colorant composition can have any suitable viscosity. For ease of handling and mixing with the other components of the composition, the colorant composition preferably exhibits a relatively low viscosity. The colorant composition preferably exhibits a viscosity (measured at approximately 20° C.) of about 5,000 cP or less, more preferably about 4,000 cP or less, more preferably about 3,000 cP or less, more preferably about 2,000 cP or less, more preferably about 1,000 cP or less, more preferably about 750 cP or less, more preferably about 500 cP or less, more preferably about 250 cP or less, or more preferably about 100 cP or less (e.g., about 50 cP or less). The colorant composition preferably has a viscosity (measured at approximately 20° C.) of about 1 cP or more, more preferably about 2 cP or more, or more preferably about 3 cP or more. In a series of preferred embodiments, the colorant composition preferably has a viscosity (measured at approximately 20° C.) of about 1 cP to about 500 cP, more preferably about 1 cP to about 250 cP, more preferably about 1 cP to about 100 cP (e.g., about 2 cP to about 100 cP, or about 3 cP to about 100 cP), or more preferably about 1 cP to about 50 cP (e.g., about 2 cP to about 50 cP, or about 3 cP to about 50 cP).

The colorant composition can be present in the composition in any suitable amount. The suitable amount of the colorant composition can depend on several factors, such as the color value of the colorant composition (i.e., which can depend on the coloring strength of the azo colorant and the concentration of the colorant in the colorant composition) and the desired shade of the composition. The colorant composition preferably is present in the composition in an amount of about 0.01 wt. % or more, more preferably about 0.1 wt. % or more, more preferably about 0.5 wt. % or more, and more preferably about 1 wt. % or more. The colorant composition preferably is present in the composition in an amount of about 5 wt. % or less, more preferably about 4 wt. % or less, and more preferably about 3 wt. % or less. Thus, in a series of preferred embodiments, the colorant composition is present in the composition in an amount of about 0.1 wt. % to about 5 wt. %, about 0.5 wt. % to about 4 wt. %, about 0.5 to about 3 wt. %, or about 1 wt. % to about 3 wt. %.

In a particularly preferred embodiment, the composition of the first embodiment comprises a urease inhibitor, a non-ionic surfactant (e.g., an alkyl aryl polyether alcohol), N-methylpyrrolidone, the colorant composition, and glycol. In such an embodiment, the composition comprises about 1 wt. % to about 50 wt. % urease inhibitor, about 1 wt. % to about 20 wt. % of a non-ionic surfactant (e.g., an alkyl aryl polyether alcohol), about 0 wt. % to about 7.5 wt. % of N-methylpyrrolidone, and about 0.1 wt. % to about 3 wt. % of the colorant composition. The remainder of the composition is glycol.

In certain embodiments, the composition of the first embodiment can further comprise a particulate substrate that acts as a carrier for the components of the composition. Particulate substrates suitable for use in the composition include, but are not limited to, the particulate substrates disclosed in U.S. Patent Application Publication No. 2007/0157689, the disclosure of which is hereby incorporated by reference. Preferably, the particulate substrate is a particulate urea-formaldehyde polymer, such as the polymer described in U.S. Patent Application Publication No. 2007/0157689. In those embodiments of the composition comprising the particulate substrate, the particulate substrate can be present in an amount of about 1 wt. % to about 99 wt. %, more preferably about 3 wt. % to about 80 wt. %, based on the total weight of the composition.

The composition of the first embodiment can be made by any suitable method. However, in a second embodiment, the invention provides a method for making the composition described above. In particular, the invention provides a method for making a composition, the method comprising the steps of:
 (a) providing a nonaqueous, liquid carrier;
 (b) providing an inhibitor compound selected from the group consisting of urease inhibitors, nitrification inhibitors, and mixtures thereof;
 (c) providing a colorant composition, the colorant composition comprising:
  (i) an azo colorant; and
  (ii) about 1 wt. % to about 60 wt. % of water;
 (d) mixing the nonaqueous, liquid carrier, the inhibitor compound, and the colorant composition to produce a composition.

The nonaqueous, liquid carrier, the inhibitor compound (s), and the colorant composition utilized in this method can be any of the candidates described above in connection with the first embodiment of the invention. Further, the amounts of each of these components can be any of the amounts (e.g., absolute amounts or relative amounts) described above in connection with the first embodiment of the invention.

The composition of the first embodiment and the composition produced by the method of the second embodiment are believed to be particularly well suited for use in the production of stabilized nitrogen fertilizers. Stabilized nitrogen fertilizers include granular fertilizers comprising a granular substrate that contains the nitrogen source (e.g., urea and/or an ammoniacal-N source) and a coating on at least a portion of the outer surface of the granular substrate. The coating composition comprises a urease inhibitor, a nitrification inhibitor, or a combination of the two. The coating and its constituents stabilize the nitrogen source and prolong the time that the nitrogen is available for absorption by the target crops.

Thus, in a third embodiment, the invention provides a method for producing a fertilizer composition, the method comprising the steps of:
 (a) providing a granular substrate having a surface, the granular substrate comprising a nitrogen source;
 (b) providing a coating composition, the coating composition comprising:
  (i) a nonaqueous, liquid carrier;
  (ii) an inhibitor compound selected from the group consisting of urease inhibitors, nitrification inhibitors, and mixtures thereof; and
  (iii) a colorant composition, the colorant composition comprising:
   (1) an azo colorant; and
   (2) about 1 wt. % to about 60 wt. % of water; and
 (c) applying the coating composition to at least a portion of the surface of the granular substrate; and
 (d) drying the granular substrate from step (c) to produce a coating on at least a portion of the surface of the granular substrate.

The granular substrate used in the method can be any suitable granular substrate comprising a nitrogen source. For example, the granular substrate can be granular urea, a granular ammonium salt, or a mixture thereof.

The nonaqueous, liquid carrier, the inhibitor compound (s), and the colorant composition utilized in this method can be any of the candidates described above in connection with the first embodiment of the invention. Further, the amounts of each of these components can be any of the amounts (e.g., absolute amounts or relative amounts) described above in connection with the first embodiment of the invention.

The coating composition can be applied to the granular substrate in any suitable amount. Preferably, the coating composition is applied to the granular substrate in an amount of about 0.01 wt. % or more, based on the total weight of the fertilizer composition. More preferably, the coating composition is applied to the granular substrate in an amount of about 0.02 wt. % or more or more preferably about 0.025 wt. %, based on the total weight of the fertilizer composition. The coating composition preferably is applied to the granular substrate in an amount of about 5 wt. % or less, based on the total weight of the fertilizer composition. In a series of preferred embodiments, the coating composition is applied to the granular substrate in an amount of about 0.01 wt. % to about 5 wt. %, more preferably about 0.02 wt. % to about 5 wt. %, or more preferably about 0.025 wt. % to about 5 wt. %.

The composition of the first embodiment and the composition produced by the method of the second embodiment can also be used in the manufacture of liquid, stabilized nitrogen fertilizers. In such embodiments, the composition typically comprise the particulate substrate described above. The particulate substrate serves as a carrier that protects the inhibitor(s) (especially the urease inhibitor) from exposure to the water present in the liquid fertilizer. In such embodiments, the liquid fertilizer can comprise an aqueous solution of urea and an ammonium salt (e.g., ammonium nitrate) in which the composition is suspended. In those embodiments in which the composition does not comprise a nitrification inhibitor, the nitrification inhibitor can be separately added to the liquid fertilizer. In the embodiments of the liquid fertilizer, the urea can be present in an amount of about 24 wt. % to about 32 wt. %, and the ammonium salt can be present in an amount 34 wt. % to about 42 wt. %. The composition can be present in an amount of about 0.01 wt. % to about 0.4 wt. %. And, in those embodiments in which the nitrification inhibitor is separately added, the nitrification inhibitor can be present in an amount of about 2 wt. % or less.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A composition comprising:
   (a) a nonaqueous, liquid carrier;
   (b) an inhibitor compound selected from the group consisting of urease inhibitors, nitrification inhibitors, and mixtures thereof; and
   (c) a colorant composition, the colorant composition comprising:
      (i) an azo colorant; and
      (ii) about 1 wt. % to about 60 wt. % of water,
   wherein the azo colorant is selected from the group consisting of (i) azo colorants comprising an azo chromophore and a polyoxyalkylene polymer covalently bound to the azo chromophore and (ii) azo colorants comprising a quaternary ammonium counterion having at least one polyoxyalkylene polymer covalently bound thereto.

2. The composition of claim 1, wherein the nonaqueous, liquid carrier is selected from the group consisting of N-methylpyrrolidone, polyvinylpyrrolidone, propylene glycols, ethanolamine, propylene carbonate, alkyl-glycol ethers, alkyl-arylpolyether alcohols, and mixtures thereof.

3. The composition of claim 1, wherein the urease inhibitor is selected from the group consisting of N-(n-butyl) thiophosphoric triamide, N-(n-butyl)phosphoric triamide, N-(2-nitrophenyl)phosphoric triamide, thiophosphoryl triamide, phenyl phosphorodiamidate, cyclohexyl thiophosphoric triamide, cyclohexyl phosphoric triamide, phosphoric triamide, hydroquinone, 1,4-benzoquinone, hexaamidocyclotriphosphazene, thiopyridines, thiopyrimidines, thiopyridine-N-oxides, N,N-dihalo-2-imidazolidinone, N-halo-2-oxazolidinone, and mixtures thereof.

4. The composition of claim 3, wherein the urease inhibitor is N-(n-butyl) thiophosphoric triamide.

5. The composition of claim 1, wherein the nitrification inhibitor is selected from the group consisting of 2-chloro-6-(trichloromethyl)pyridine, 2-amino-4-chloromethylpyrimidine, dicyandiamide, 3,4-dimethyl pyrazole phosphate, cyanoguanidine, N-2,5-dichlorophenylsuccinanilic acid, guanyl thiourea, sulfanyll-amidothiazole, 4-amino-1,2,4-triazole, 3-methylpyrazole, 1H-1,2,4-triazole, and mixtures thereof.

6. The composition of claim 1, wherein the composition comprises a urease inhibitor and a nitrification inhibitor.

7. A method for making a composition, the method comprising the steps of:
   (a) providing a nonaqueous, liquid carrier;
   (b) providing an inhibitor compound selected from the group consisting of urease inhibitors, nitrification inhibitors, and mixtures thereof;

(c) providing a colorant composition, the colorant composition comprising:
(i) an azo colorant; and
(ii) about 1 wt. % to about 60 wt. % of water;
(d) mixing the nonaqueous, liquid carrier, the inhibitor compound, and the colorant composition to produce a composition,
wherein the azo colorant is selected from the group consisting of (i) azo colorants comprising an azo chromophore and a polyoxyalkylene polymer covalently bound to the azo chromophore and (ii) azo colorants comprising a quaternary ammonium counterion having at least one polyoxyalkylene polymer covalently bound thereto.

8. The method of claim 7, wherein the nonaqueous, liquid carrier is selected from the group consisting of N-methylpyrrolidone, polyvinylpyrrolidone, propylene glycols, ethanolamine, propylene carbonate, alkyl-glycol ethers, alkyl-arylpolyether alcohols, and mixtures thereof.

9. The method of claim 7, wherein the urease inhibitor is selected from the group consisting of N-(n-butyl)thiophosphoric triamide, N-(n-butyl)phosphoric triamide, N-(2-nitrophenyl)phosphoric triamide, thiophosphoryl triamide, phenyl phosphorodiamidate, cyclohexyl thiophosphoric triamide, cyclohexyl phosphoric triamide, phosphoric triamide, hydroquinone, 1,4-benzoquinone, hexaamidocyclotriphosphazene, thiopyridines, thiopyrimidines, thiopyridine-N-oxides, N,N-dihalo-2-imidazolidinone, N-halo-2-oxazolidinone, and mixtures thereof.

10. The method of claim 9, wherein the urease inhibitor is N-(n-butyl) thiophosphoric triamide.

11. The method of claim 7, wherein the nitrification inhibitor is selected from the group consisting of 2-chloro-6-(trichloromethyl)pyridine, 2-amino-4-chloromethylpyrimidine, dicyandiamide, 3,4-dimethyl pyrazole phosphate, cyanoguanidine, N-2,5-dichlorophenylsuccinanilic acid, guanyl thiourea, sulfanyll-amidothiazole, 4-amino-1,2,4-triazole, 3-methylpyrazole, 1H-1,2,4-triazole, and mixtures thereof.

12. The method of claim 7, wherein the inhibitor compound comprises a urease inhibitor and a nitrification inhibitor.

13. A method for producing a fertilizer composition, the method comprising the steps of:
(a) providing a granular substrate having a surface, the granular substrate comprising a nitrogen source;
(b) providing a coating composition, the coating composition comprising:
(i) a nonaqueous, liquid carrier;
(ii) an inhibitor compound selected from the group consisting of urease inhibitors, nitrification inhibitors, and mixtures thereof; and
(iii) a colorant composition, the colorant composition comprising:
(1) an azo colorant; and
(2) about 1 wt. % to about 60 wt. % of water; and
(c) applying the coating composition to at least a portion of the surface of the granular substrate; and
(d) drying the granular substrate from step (c) to produce a coating on at least a portion of the surface of the granular substrate,
wherein the azo colorant is selected from the group consisting of (i) azo colorants comprising an azo chromophore and a polyoxyalkylene polymer covalently bound to the azo chromophore and (ii) azo colorants comprising a quaternary ammonium counterion having at least one polyoxyalkylene polymer covalently bound thereto.

14. The method of claim 13, wherein the nonaqueous, liquid carrier is selected from the group consisting of N-methylpyrrolidone, polyvinylpyrrolidone, propylene glycols, ethanolamine, propylene carbonate, alkyl-glycol ethers, alkyl-arylpolyether alcohols, and mixtures thereof.

15. The method of claim 13, wherein the urease inhibitor is selected from the group consisting of N-(n-butyl)thiophosphoric triamide, N-(n-butyl)phosphoric triamide, N-(2-nitrophenyl)phosphoric triamide, thiophosphoryl triamide, phenyl phosphorodiamidate, cyclohexyl thiophosphoric triamide, cyclohexyl phosphoric triamide, phosphoric triamide, hydroquinone, 1,4-benzoquinone, hexaamidocyclotriphosphazene, thiopyridines, thiopyrimidines, thiopyridine-N-oxides, N,N-dihalo-2-imidazolidinone, N-halo-2-oxazolidinone, and mixtures thereof.

16. The method of claim 15, wherein the urease inhibitor is N-(n-butyl) thiophosphoric triamide.

17. The method of claim 13, wherein the nitrification inhibitor is selected from the group consisting of 2-chloro-6-(trichloromethyl)pyridine, 2-amino-4-chloromethylpyrimidine, dicyandiamide, 3,4-dimethyl pyrazole phosphate, cyanoguanidine, N-2,5-dichlorophenylsuccinanilic acid, guanyl thiourea, sulfanyll-amidothiazole, 4-amino-1,2,4-triazole, 3-methylpyrazole, 1H-1,2,4-triazole, and mixtures thereof.

18. The method of claim 13, wherein the coating composition comprises a urease inhibitor and a nitrification inhibitor.

* * * * *